UNITED STATES PATENT OFFICE.

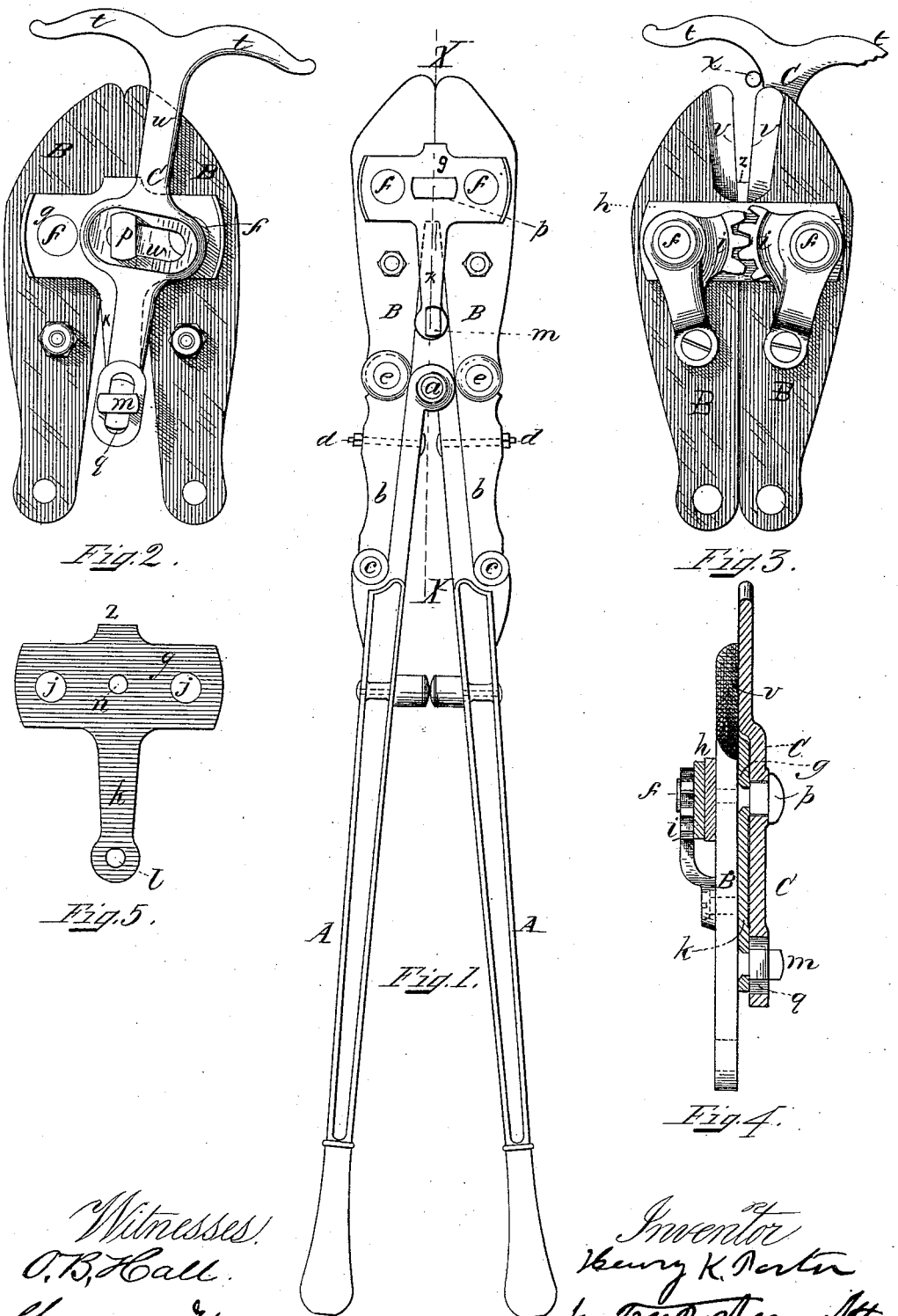

HENRY K. PORTER, OF BOSTON, MASSACHUSETTS.

CUTTER FOR WIRES.

SPECIFICATION forming part of Letters Patent No. 444,541, dated January 13, 1891.

Application filed May 15, 1890. Serial No. 351,907. (No model.)

*To all whom it may concern:*

Be it known that I, HENRY K. PORTER, of Boston, in the county of Suffolk and State of Massachusetts, have invented a new and useful Improvement in Cutters for Wires, &c., which will, in connection with the accompanying drawings, be hereinafter fully described, and specifically defined in the appended claims.

In said drawings, Figure 1 is an under side plan view of my improved cutter, shown as closed, and with the guiding-hook removed. Fig. 2 is a like view of the cutting-jaws detached from the handles and with the hook in position as for use. Fig. 3 is a reverse or top plan view of Fig. 2, but with the jaws opened. Fig. 4 is a longitudinal central section, as on line X, through that portion of the cutter shown in Figs. 2 and 3, with the guiding-hook centrally arranged, and also shown in section. Fig. 5 is a detached plan view of the T-strap on which the guiding-hook is mounted.

This invention relates to cutters that are intended for cutting electric wires, in positions more or less elevated, and which it may become necessary to sever, especially in case of fire or other sudden exigency.

The invention is shown in connection with the cutter patented to me by Letters Patent dated April 6, 1880, January 18, 1881, and August 9, 1881, but being susceptible of use with any and all "open-shear" cutters, by which wires of the diameter required to be severed may be cut.

The invention consists in features of novelty and the combination thereof, that will, in connection with the accompanying drawings, be hereinafter described, and specified in the claims.

Referring again to said drawings, A A represent the handles or levers of the cutter, which are pivotally connected at *a*. To each of these levers is pivoted a side arm *b* by a pivot *c*, said arms being at their front ends secured to handles A by bolts *d*. The cutting-jaws B B are at their rear ends pivoted at *e e* to the front ends of arms *b*, while near their forward ends they are pivoted upon bolts *f f*, secured in holes *j j* in under strap *g* and in top strap *h*, a pair of equalizing-gears *i* being shown as secured to bolts *f* and jaws B, all said parts being shown and fully described in my said former patents, and, further, being here shown only for the purpose of presenting some means of carrying my present invention into effect, but without confining it to any kind of cutter, the foregoing parts need be here no further described.

Upon under strap *g* I form a rearward projection *k*, having at its end a hole *l*, in which is secured the T-headed and shouldered stud *m*, said shoulder resting upon *k*, (see Fig. 4,) and the stud being secured in place either by riveting, as shown in Fig. 4, or by being screw-threaded in *k;* but I prefer riveting. In strap *g*, equidistant between the holes *j*, I form hole *n*, in which is secured the T-headed stud *p*, formed like stud *m*, and secured in the strap in like manner. I also provide a hook C, (shown as having at its rear end a longitudinal slot *q* slightly longer than the greater diameter of the head of stud *m*,) and a transverse slot *u* near its lineal center, which is slightly longer than the greater diameter of the head of the stud *p*. At the front end of said hook it terminates in two prongs or horns *t*, as shown. By securing studs *m p* in their places in the manner specified they may be rotated when necessary without becoming loose or danger of their being lost, and when turned to the position shown in Fig. 1 the hook may be placed upon strap *g* and extension *k*, when by turning said studs to the position shown in Fig. 2 the hook is not only secured in position, but it may be freely vibrated to the extent permitted by slot *w*, the stud *m* being the fulcrum or pivot on which it vibrates, while stud *p* prevents lineal movement of the hook. As great force is often requisite to sever the larger sizes of wire, therefore the cutting-edges *v* can be but slightly opened, (as a wider opening would require a relative sacrifice of leverage or power.) Therefore some means of guiding the wire *v* into the limited space between the cutting-edges is requisite, the more especially in the night-time, or when enveloped in smoke as in case of fires, when the wires must be removed to facilitate the manipulation of fire-extinguishing apparatus, and for this purpose hook C is employed. As the user of the cutter can by moving it edgewise bring it into contact with the wire, when by retracting the cutter (drawing it toward himself) a prong $t$ of the hook will engage the wire, when by pressing the hook against the wire and at the same time advancing the cutter the wire will be guided between edges $v$, when it may be severed. The width of part $w$ of the hook and the escape of vibration of the hook being such that to whichever side the hook is vibrated (to its full limit) the edge of part $w$ so coincides with the adjacent edge $v$ that as the hook is advanced across the wire the latter is thereby guided between said edges $v$. As the rear termination of edges $v$ is by the opening of the jaws advanced in front of the front edge of strap $g$, it is therefore requisite that a stop be provided to prevent small wires from entering so far between the jaws as that the edges cannot act upon the wire, and as such stop I form the projection $z$ upon the front edge of strap $g$, which is of such proportion as that, while it will not obstruct the introduction of wire of any size between the jaws so that it may be thereby severed, will yet prevent small wires from so far passing in as to be beyond the inner end of edges $v$, by which the wires are severed.

Instead of forming the hook with two prongs and arranging it to vibrate, it may have but one prong and be secured rigidly to strap $g$, so as to guide the wire; but it is much preferable, as shown.

Having thus described my invention, what I claim is—

1. In combination with a cutter of the general class specified and a guiding-hook arranged to co-operate therewith, a part or member, as $k$, extended rearward from the pivot-supporting strap and connected with and arranged to aid in supporting the hook, substantially as specified.

2. In combination with a cutter of the general class specified, a guiding-hook mounted thereon and provided with lateral adjustment relatively to the jaws of such cutter when opened, substantially as specified.

3. The combination, with a cutter of the general class specified, of a forked hook mounted thereon and having a transverse slot near its lineal center and a passage for a pivot at its rear end, together with such rear pivot, and a supporting-stud in said transverse passage, substantially as specified.

4. In combination with the jaws of the cutter and the pivot-supporting strap, the hook formed with the transverse and longitudinal slots and the hook-supporting studs arranged in said slots and secured in the strap and its extension, substantially as specified.

5. In combination with the cutter, the strap having the rearward extension, and the hook formed with the slots, as described, the T-headed studs, respectively arranged in said slots and secured in the strap and extension by being shouldered therein and riveted therein, substantially as specified.

6. The combination, with the cutter and the strap having a rearward extension, of the two pronged or forked hook having a transverse slot near its lineal center and a passage at its rear end, and studs arranged in said slots and secured in strap and extension, substantially as specified.

7. The combination, with the cutter and the T-shaped strap, of a guiding-hook thereto secured, substantially as specified,

HENRY K. PORTER.

Witnesses:
O. B. HALL,
T. W. PORTER.